(12) United States Patent
Ulsaker et al.

(10) Patent No.: US 10,718,559 B2
(45) Date of Patent: Jul. 21, 2020

(54) AIR FILTER BRACKET

(71) Applicant: Electrolux Home Products, Inc., Charlotte, NC (US)

(72) Inventors: Jonathan Edward Ulsaker, Clemson, SC (US); Ronaldo M. Oliveira, Anderson, SC (US); Cory Dale Simpson, Abbeville, SC (US); Brian Roesch, Anderson, SC (US); Rodrigo Pagnozzi, Anderson, SC (US); Ali Khan Mayanna, Anderson, SC (US); Josh Hanson, Charlotte, NC (US)

(73) Assignee: Electrolux Home Products, Inc., Charlotte, NC (US)

( * ) Notice: Subject to any disclaimer, the term of this patent is extended or adjusted under 35 U.S.C. 154(b) by 233 days.

(21) Appl. No.: 15/846,437

(22) Filed: Dec. 19, 2017

(65) Prior Publication Data

US 2019/0186805 A1 Jun. 20, 2019

(51) Int. Cl.
*B01D 50/00* (2006.01)
*F25D 17/04* (2006.01)
(Continued)

(52) U.S. Cl.
CPC ........... *F25D 17/042* (2013.01); *B01D 39/18* (2013.01); *B01D 46/0012* (2013.01); *B01D 46/0036* (2013.01); *B01D 46/0041* (2013.01); *B01D 46/521* (2013.01); *F25D 11/02* (2013.01); *F25D 17/062* (2013.01); *F25D 17/067* (2013.01); *F25D 29/006* (2013.01);
(Continued)

(58) Field of Classification Search
CPC .... F25D 17/042; F25D 29/006; F25D 17/067;
F25D 11/02; F25D 2317/0672; F25D 2317/0671; F25D 2317/067; F25D 2317/041; F25D 17/062; B01D 39/18; B01D 46/0041; B01D 46/0012; B01D 46/0036; B01D 46/521; B01D 2273/30
See application file for complete search history.

(56) References Cited

U.S. PATENT DOCUMENTS

| 5,568,730 A | 10/1996 | Kim et al. |
| 6,286,330 B1 | 9/2001 | Kopf |

(Continued)

FOREIGN PATENT DOCUMENTS

| EP | 2476979 | 7/2012 |
| EP | 3217126 | 9/2017 |
| WO | 2010099464 | 9/2010 |

OTHER PUBLICATIONS

International Search Report for PCT/US2018/065585, dated Mar. 19, 2019, 2 pages.

*Primary Examiner* — Dung H Bui
(74) *Attorney, Agent, or Firm* — Pearne & Gordon LLP (57) ABSTRACT

A refrigerator including a cabinet, a liner defining a compartment within the cabinet, a fan to move cooled air, and an air tower positioned adjacent the liner and provided in fluid communication with the compartment via a plurality of primary exhaust openings. The refrigerator further includes an air filter bracket separate from and located adjacent to the air tower and provided in fluid communication with both the air tower and the compartment. The air filter bracket includes a duct positioned adjacent the flow path of the air tower to be in fluid communication with a secondary exhaust opening of the air tower.

18 Claims, 9 Drawing Sheets

(51) Int. Cl.
*F25D 11/02* (2006.01)
*F25D 17/06* (2006.01)
*F25D 29/00* (2006.01)
*B01D 46/52* (2006.01)
*B01D 46/00* (2006.01)
*B01D 39/18* (2006.01)

(52) U.S. Cl.
CPC .... *B01D 2273/30* (2013.01); *F25D 2317/041* (2013.01); *F25D 2317/067* (2013.01); *F25D 2317/0671* (2013.01); *F25D 2317/0672* (2013.01)

(56) References Cited

U.S. PATENT DOCUMENTS

| | | |
|---|---|---|
| 6,918,259 B2 | 7/2005 | Anderson et al. |
| 7,654,102 B2 | 2/2010 | Hurlebaus et al. |
| 7,690,586 B2 | 4/2010 | Kang |
| 7,824,480 B2 | 11/2010 | Hurlebaus et al. |
| 7,988,771 B2 | 8/2011 | Anikhindi et al. |
| 8,157,882 B2 | 4/2012 | Curtis et al. |
| 9,557,091 B1 | 1/2017 | Zardo et al. |
| 9,671,149 B2 | 6/2017 | Kim et al. |
| 9,702,611 B2 | 7/2017 | Kang et al. |
| 2007/0107452 A1* | 5/2007 | Kim ............... F25D 17/042 62/264 |
| 2007/0266725 A1 | 11/2007 | Anikhindi et al. |
| 2009/0217694 A1* | 9/2009 | Kim ............... F25D 17/042 62/426 |
| 2009/0277210 A1* | 11/2009 | Eveland ............ F25C 5/22 62/441 |
| 2010/0300137 A1* | 12/2010 | Lim ............... F25D 17/065 62/419 |
| 2012/0204581 A1 | 8/2012 | Kang et al. |
| 2013/0015753 A1 | 1/2013 | Son et al. |
| 2014/0245771 A1 | 9/2014 | Kim et al. |
| 2014/0298835 A1 | 10/2014 | Choi et al. |
| 2014/0368103 A1 | 12/2014 | Son et al. |
| 2015/0033784 A1 | 2/2015 | Park et al. |
| 2016/0341467 A1 | 11/2016 | Mitchell et al. |
| 2017/0011504 A1 | 1/2017 | Zardo et al. |
| 2017/0191728 A1 | 7/2017 | Seo |
| 2017/0216475 A1 | 8/2017 | Park et al. |
| 2017/0336128 A1* | 11/2017 | de Cavalcanti ....... F25D 17/042 |

\* cited by examiner

FIG. 8

AIR FILTER BRACKET

FIELD OF THE INVENTION

This application relates generally to an air filter for a refrigeration appliance, and more particularly, to a refrigeration appliance including an air filter bracket located adjacent to an air tower within a compartment of the refrigeration appliance.

BACKGROUND OF THE INVENTION

Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C., such as between 0.25° C. and 4.5° C. and the freezer compartments at temperatures below 0° C., such as between 0° C. and −20° C.

The arrangements of the fresh food and freezer compartments with respect to one another in such refrigerators vary. For example, in some cases, the freezer compartment is located above the fresh food compartment and in other cases the freezer compartment is located below the fresh food compartment. Additionally, many modern refrigerators have their freezer compartments and fresh food compartments arranged in a side-by-side relationship. Whatever arrangement of the freezer compartment and the fresh food compartment is employed, typically, separate access doors are provided for the compartments so that either compartment may be accessed without exposing the other compartment to the ambient air.

Refrigeration appliances are also known to include an air filter within at least the fresh food compartment in order to improve air quality therein. The air filter is positioned within a housing that is generally attached to some structure within the fresh food compartment.

Many modern refrigerators use a passive air filter design. That is, the air filter is positioned within a refrigerator such that said filter is not in direct fluid communication with a cooling air conduit. Rather, the natural airflow of the air cooled by the evaporator within the fresh food compartment will circulate through the filter to improve the air quality.

Other modern refrigerators have an active air filter design. That is, the air filter is positioned in direct fluid communication with a cooling air conduit. As such, the air cooled by the evaporator will forcibly pass through the air filter before entering the fresh food compartment. Placing the air filter housing in a location that facilitates the active design is difficult. It requires reconfiguring cooling air conduits that guide air from the evaporator to the fresh food compartment. Additionally, the placement of the housing can negatively impact the overall aesthetics of the fresh food compartment.

BRIEF SUMMARY OF THE INVENTION

In accordance with one aspect, there is provided a refrigerator including a cabinet, a liner defining a compartment within the cabinet, and a fan disposed outside the compartment. The refrigerator further includes an air tower that is positioned adjacent the liner and provided in fluid communication with the compartment via a plurality of primary exhaust openings. The air tower defines a flow path between the fan and the compartment such that the fan directs air into the air tower and the flow path of the air tower guides a major portion of the air into the compartment via at least one of the primary exhaust openings.

The refrigerator further yet includes an air filter bracket that is separate from and located adjacent to the air tower. The air filter bracket is provided in fluid communication with both the air tower and the compartment. Specifically, the air filter bracket comprises a pocket that captures an air filter medium therein. The pocket includes at least one securing member that secures the air filter medium within the pocket.

The air filter bracket further includes a duct positioned adjacent the flow path of the air tower. The duct is in fluid communication with a secondary exhaust opening of the air tower. Moreover, the duct directs air into the air filter bracket to pass through the air filter medium therein and is positioned such that a minor portion of the air guided through the air tower is directed through the air filter bracket by the duct.

In accordance with another aspect, there is provided a refrigerator including a cabinet, a liner defining a compartment within the cabinet and a fan disposed outside the compartment. The refrigerator further includes an air tower that is positioned adjacent the liner and provided in fluid communication with the compartment via a plurality of primary exhaust openings that are positioned on a front surface of the air tower. The air tower defines a flow path between the fan and the compartment such that the fan directs air into the air tower and the flow path of the air tower guides a major portion of the air into the compartment via the primary exhaust openings.

The refrigerator still further includes an air filter bracket that is separate from the air tower and includes a portion located vertically above said air tower. The air filter bracket is provided in fluid communication with both the air tower and the compartment. Specifically, the air filter bracket includes a pocket that captures an air filter medium therein. The pocket has at least one securing member that secures the air filter medium within the pocket The air filter bracket further includes a duct positioned adjacent the flow path of the air tower to be in fluid communication with a secondary exhaust opening of the air tower positioned at a top portion of the air tower. The secondary exhaust opening is defined by a gap between the air tower and the air filter bracket. The duct directs air into the air filter bracket to pass through the air filter medium therein and is positioned such that a minor portion of the air guided through the air tower is directed through the air filter bracket by the duct.

Further still, the refrigerator includes a duct cover attached to a rear side of the air filter bracket. The duct cover guides the minor portion of air entering the duct to the air filter medium.

DESCRIPTION OF EXAMPLE EMBODIMENTS

Apparatus will now be described more fully hereinafter with reference to the accompanying drawings in which embodiments of the disclosure are shown. Whenever possible, the same reference numerals are used throughout the drawings to refer to the same or like parts. However, this disclosure may be embodied in many different forms and should not be construed as limited to the embodiments set forth herein.

Figure 1:
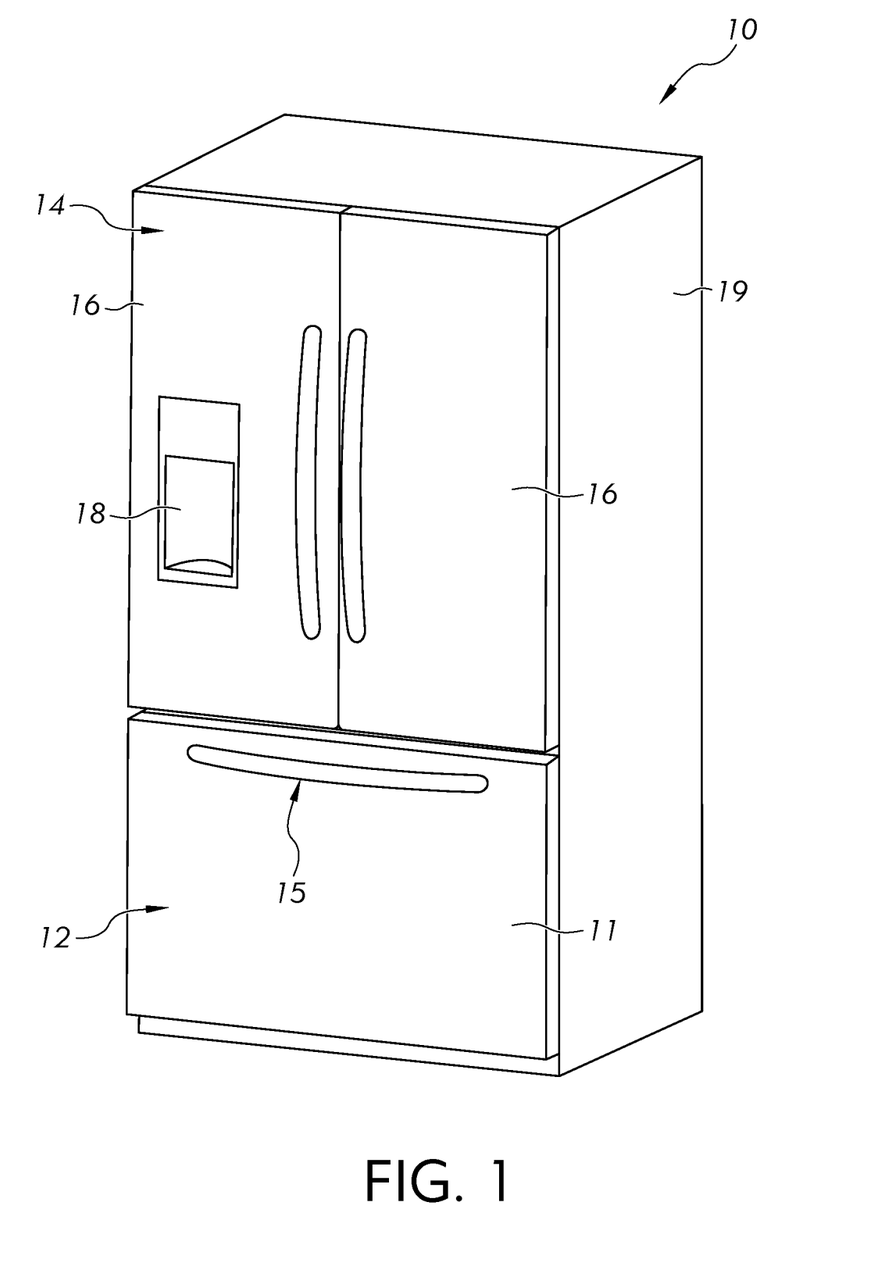
FIG. 1 is a front perspective view of a household French Door Bottom Mount refrigerator wherein doors of the refrigerator are in a closed position.

Referring now to the drawings, FIG. 1 shows a refrigeration appliance in the form of a domestic refrigerator, indicated generally at 10. Although the detailed description that follows concerns a domestic refrigerator 10, the invention can be embodied by refrigeration appliances other than with a domestic refrigerator 10. Further, an embodiment is described in detail below, and shown in the figures as a bottom-mount configuration of a refrigerator 10, including a fresh food compartment 14 disposed vertically above a freezer compartment 12. However, the refrigerator 10 can have any desired configuration including at least a fresh food compartment 14 and/or a freezer compartment 12, such as a top mount refrigerator (freezer disposed above the fresh food compartment), a side-by-side refrigerator (fresh food compartment is laterally next to the freezer compartment), a standalone refrigerator or freezer, etc.

Figure 2:
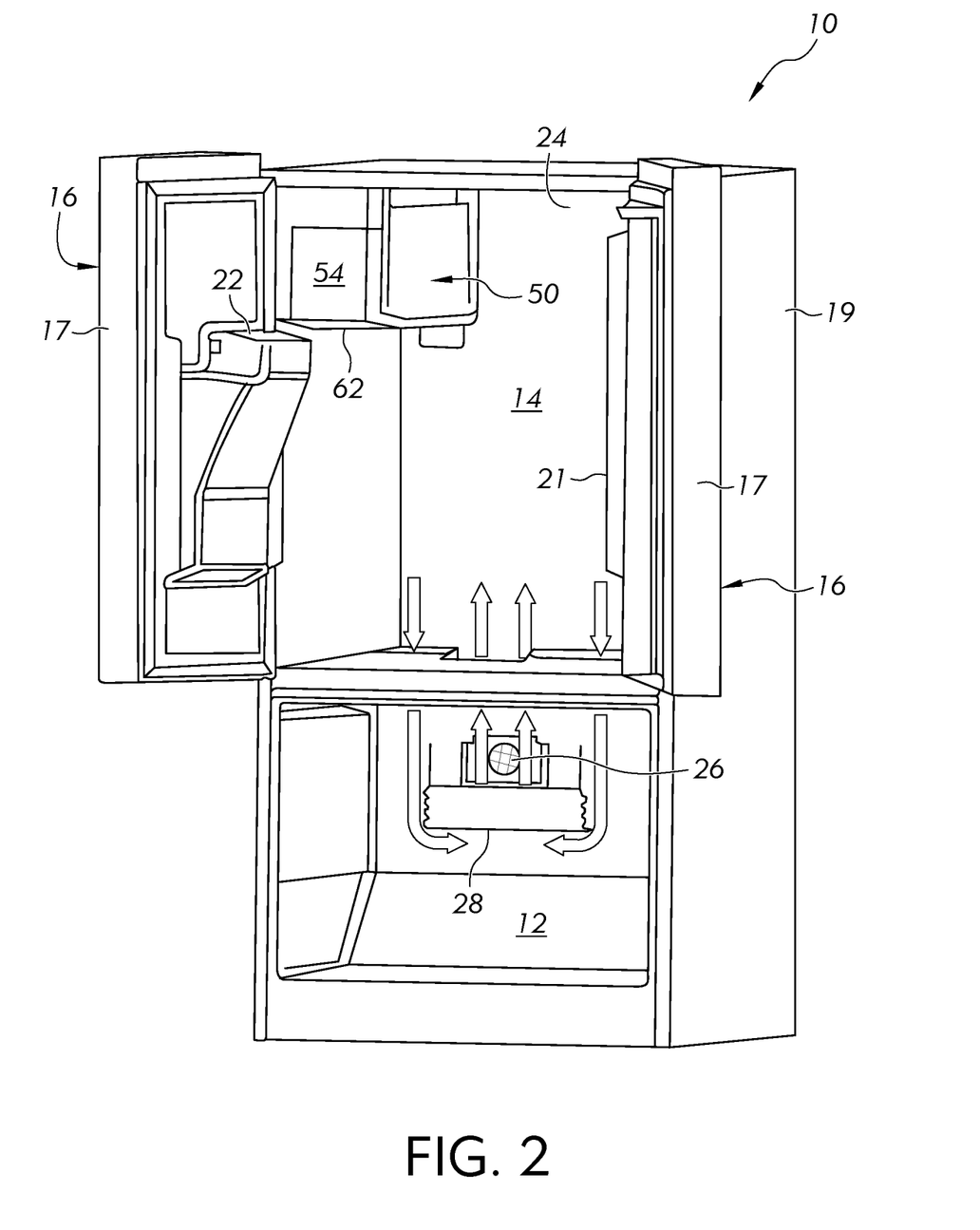
FIG. 2 is a front perspective view of the refrigerator of FIG. 1 showing the doors in an opened position and an interior of a fresh food compartment.

One or more doors 16 shown in FIG. 1 are pivotally coupled to a cabinet 19 of the refrigerator 10 to restrict and grant access to the fresh food compartment 14. The door 16 can include a single door that spans the entire lateral distance across the entrance to the fresh food compartment 14, or can include a pair of French-type doors 16 as shown in FIG. 1 that collectively span the entire lateral distance of the entrance to the fresh food compartment 14 to enclose the fresh food compartment 14. For the latter configuration, a center flip mullion 21 (FIG. 2) is pivotally coupled to at least one of the doors 16 to establish a surface against which a seal provided to the other one of the doors 16 can seal the entrance to the fresh food compartment 14 at a location between opposing side surfaces 17 (FIG. 2) of the doors 16. The mullion 21 can be pivotally coupled to the door 16 to pivot between a first orientation that is substantially parallel to a planar surface of the door 16 when the door 16 is closed, and a different orientation when the door 16 is opened. The externally-exposed surface of the center mullion 21 is substantially parallel to the door 16 when the center mullion 21 is in the first orientation, and forms an angle other than parallel relative to the door 16 when the center mullion 21 is in the second orientation. The seal and the externally-exposed surface of the mullion 21 cooperate approximately midway between the lateral sides of the fresh food compartment 14.

A dispenser 18 (FIG. 1) for dispensing at least ice pieces, and optionally water, can be provided on an exterior of one of the doors 16 that restricts access to the fresh food compartment 14. The dispenser 18 includes an actuator (e.g., lever, switch, proximity sensor, etc.) to cause frozen ice pieces to be dispensed from an ice bin 54 (FIG. 2) of an ice maker 50 disposed within the fresh food compartment 14. Ice pieces from the ice bin 54 can exit the ice bin 54 through an aperture 62 and be delivered to the dispenser 18 via an ice chute 22 (FIG. 2), which extends at least partially through the door 16 between the dispenser 18 and the ice bin 54.

Referring to FIG. 1, the freezer compartment 12 is arranged vertically beneath the fresh food compartment 14. A drawer assembly (not shown) including one or more freezer baskets (not shown) can be withdrawn from the freezer compartment 12 to grant a user access to food items stored in the freezer compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer compartment 12.

In alternative embodiments, the ice maker is located within the freezer compartment. In this configuration, although still disposed within the freezer compartment, at least the ice maker (and possible an ice bin) is mounted to an interior surface of the freezer door. It is contemplated that the ice mold and ice bin can be separate elements, in which one remains within the freezer compartment and the other is on the freezer door.

The freezer compartment 12 is used to freeze and/or maintain articles of food stored in the freezer compartment 12 in a frozen condition. For this purpose, the freezer compartment 12 is in thermal communication with a freezer evaporator 28 that removes thermal energy from the freezer compartment 12 to maintain the temperature therein at a temperature of 0° C. or less during operation of the refrigerator 10, preferably between 0° C. and −50° C., more preferably between 0° C. and −30° C. and even more preferably between 0° C. and −20° C.

The refrigerator 10 includes an interior liner 24 (FIG. 2) that defines the fresh food compartment 14. The fresh food compartment 14 is located in the upper portion of the refrigerator 10 in this example and serves to minimize spoiling of articles of food stored therein. The fresh food compartment 14 accomplishes this by maintaining the temperature in the fresh food compartment 14 at a cool temperature that is typically above 0° C., so as not to freeze the articles of food in the fresh food compartment 14. It is contemplated that the cool temperature preferably is between 0° C. and 10° C., more preferably between 0° C. and 5° C. and even more preferably between 0.25° C. and 4.5° C. According to some embodiments, cool air from which thermal energy has been removed by the freezer evaporator 28 can also be blown into the fresh food compartment 14 to maintain the temperature therein greater than 0° C. preferably between 0° C. and 10° C., more preferably between 0° C. and 5° C. and even more preferably between 0.25° C. and 4.5° C. Specifically, a fan 26 disposed outside the fresh food compartment 14 (e.g., located within the freezer compartment 12) blows cold air generated by the freezer evaporator 28 into the fresh food compartment 14.

For alternate embodiments, a separate fresh food evaporator can optionally be dedicated to separately maintaining the temperature within the fresh food compartment 14 independent of the freezer compartment 12. According to an embodiment, the temperature in the fresh food compartment 14 can be maintained at a cool temperature within a close tolerance of a range between 0° C. and 4.5° C., including any subranges and any individual temperatures falling with that range. For example, other embodiments can optionally maintain the cool temperature within the fresh food compartment 14 within a reasonably close tolerance of a temperature between 0.25° C. and 4° C. In such an embodiment, the fresh food evaporator could be used to provide the cooled air to be distributed by the air tower. In such a configuration, a fan could be disposed within the fresh food compartment, i.e., in the same refrigerated compartment as the air tower. That is, the fan does not necessarily need to be in a separate compartment. Likewise, in a dedicated refrigerator appliance (i.e., fresh food compartment only) or a dedicated freezer appliance (i.e., freezer compartment only), the air tower can be located within the same compartment as the fan that pushes the cooled air therethrough.

Figure 3:
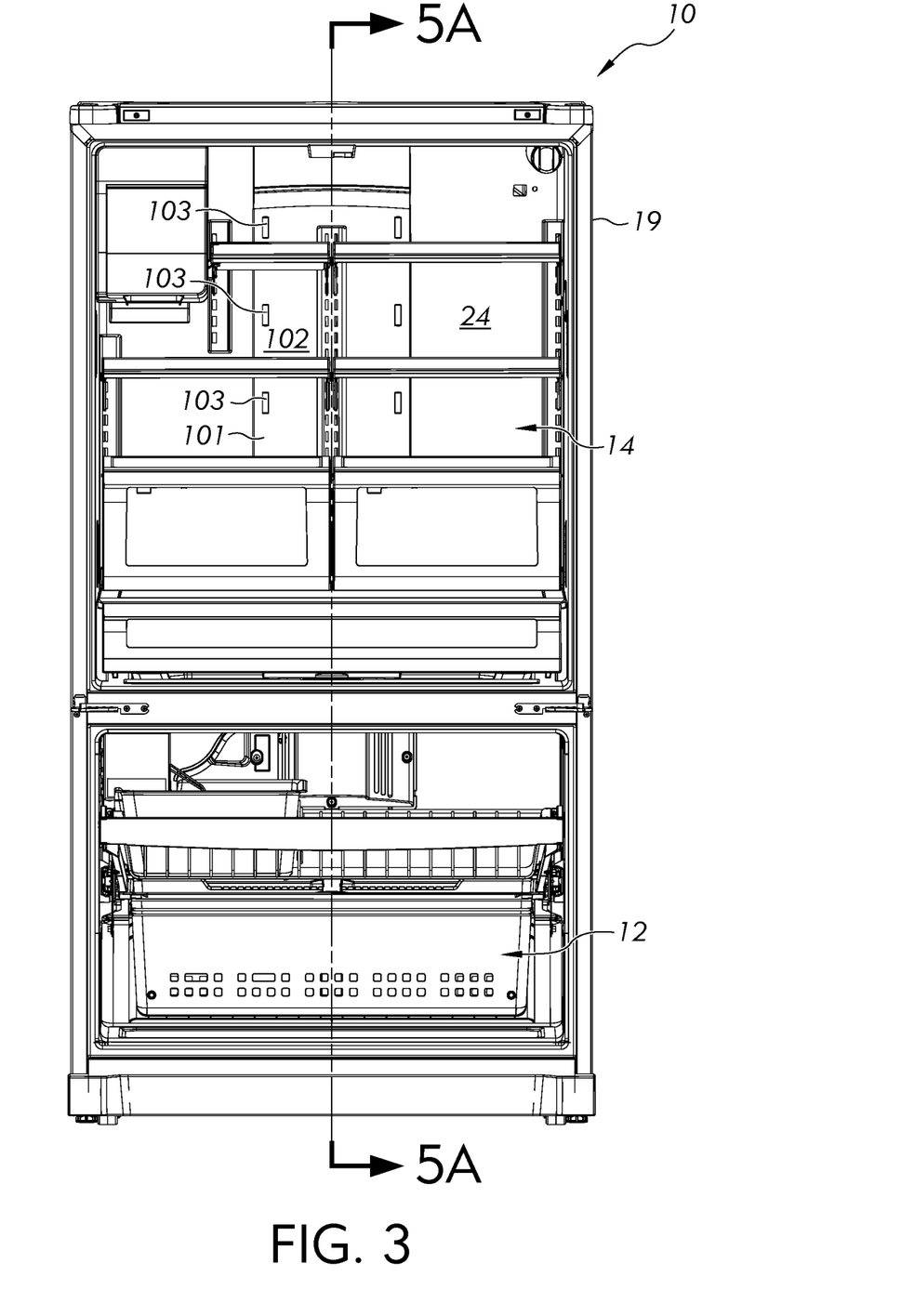
FIG. 3 is a front view of a bottom-mount refrigerator according to a first embodiment showing an air tower positioned adjacent a liner within the fresh food compartment.

Referring now to FIG. 3, a refrigerator 10 according to a first embodiment is shown. An interior liner 24 defines the fresh food compartment 14 within the cabinet 19. Moreover, a fan (not shown) is disposed outside of the fresh food compartment 14 and is configured to blow cold air into the fresh food compartment 14. In one example, the fan can be positioned in the same location as fan 26 shown in FIG. 2.

An air tower 101 is positioned adjacent the liner 24 and extends outwards therefrom. The air tower 101 may be formed integral with the liner 24. Alternatively, the air tower 101 may be removably attached to the interior liner 24. Further, the air tower 101 may be located on a rear wall of the fresh food compartment 14 and centrally positioned in a horizontal direction with respect to the rear wall.

The air tower 101 includes a front surface 102 and opposing side surfaces which extend outward, in a perpendicular direction, away from the front surface 102. The distal end of each opposing side surface is engaged with the liner 24 such that the air tower 101 extends outwards from the liner 24 at a gapped distance. Due to this gapped distance, the air tower 101 defines a flow path between the fan (not shown) and the fresh food compartment 14. Specifically, the fan (not shown) directs air into the air tower 101 and the flow path of the air tower 101 guides the air vertically upwards.

The interior of the air tower 101 may contain insulating foam that further defines the flow path. Since the refrigerated air entering the air tower 101 is often relatively colder than the temperature of the fresh food compartment 14, the use of insulating foam within the air tower 101 helps to avoid condensation and/or uneven cold areas within the fresh food compartment 14. However, the use of insulation is not required. For example, where the air tower 101 is used in a freezer compartment, such insulation may or may not be used.

Moreover, the air tower 101 is provided in fluid communication with the fresh food compartment 14 by way of a plurality of primary exhaust openings 103. In the shown example, the primary exhaust openings 103 are positioned on the front surface 102 of the air tower 101. In further embodiments, the primary exhaust openings 103 may be additionally and/or alternatively positioned on at least one of the opposing side surfaces of the air tower 101.

Figure 4A:
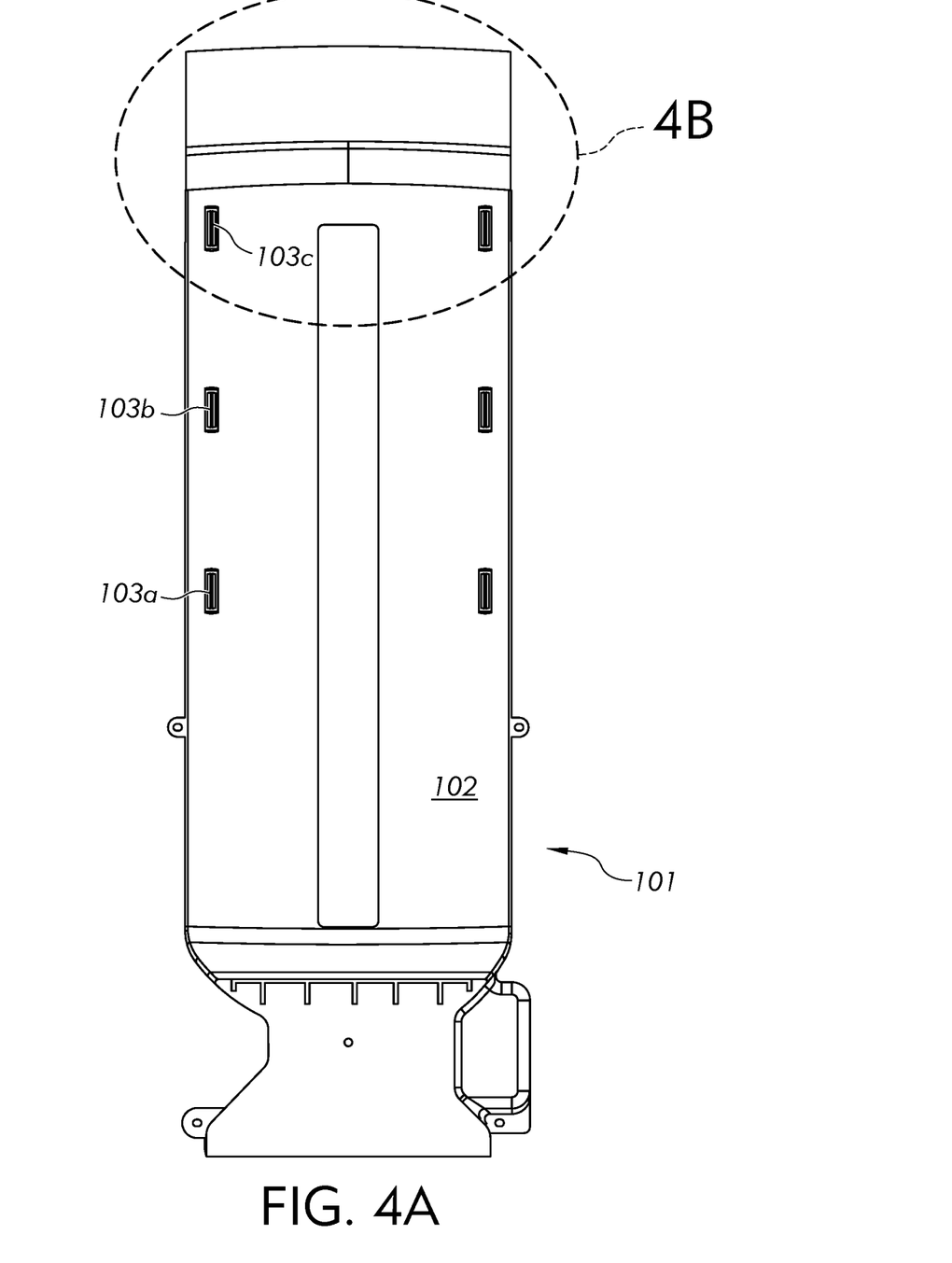
FIG. 4A is a front view of the air tower and an air filter bracket.

With reference to FIG. 4A, as will be explained in detail below, the plurality of primary exhaust openings are positioned on the front surface 102 of the air tower 101 and disposed in a vertical orientation such that a major portion of the air guided by the flow path of the air tower 101 is released into the fresh food compartment 14 via the plurality of primary exhaust openings 103.

As shown, the plurality of primary exhaust openings 103 includes a first pair of primary exhaust openings 103a, a second pair of primary exhaust openings 103b, and a third pair of primary exhaust openings 103c, that are disposed on the front surface 102 of the air tower in a vertical orientation, in this order, from bottom to top. As the fan (not shown) directs air into the air tower 101, the flow path of the air tower 101 guides the air vertically upwards. A major portion of the air entering the air tower 101 is released into the fresh food compartment 14 via the plurality of primary exhaust openings 103. It is contemplated that various other arrangements of exhaust openings can be used.

Specifically, as the air travels vertically upwards through the flow path of the air tower 101, air will initially be released into the fresh food compartment 14 via the first pair of primary exhaust openings 103a. Due to the relatively small dimensions of the primary exhaust openings 103, not all of the air will be released into the fresh food compartment 14 via the first pair of primary exhaust openings 103a. Rather, the remaining air in the flow path will continue to travel vertically upwards where portions of said remaining air will likewise be released into the fresh food compartment 14 via the second and third pairs of primary exhaust openings 103b, 103c.

In other words, the major portion of the air guided by the flow path of the air tower 101 is released into the fresh food compartment 14 by way of the first, second, and third pair of primary exhaust openings 103a, 103b, 103c. Thus, it follows that not all of the air entering the air tower 101 will be released into the fresh food compartment 14 via the plurality of primary exhaust openings 103. For example, an amount of the major portion of air released into the compartment via the plurality of primary exhaust openings 103 is within a range of 51%-90% of an amount of air being directed into the air tower 101 via the fan (not shown).

The remaining portion of the air guided by the flow path of the air tower 101 that is not released into the fresh food compartment 14 via the plurality of primary exhaust openings 103 is released into the fresh food compartment 14 via a secondary exhaust opening 104. That is, a minor portion of the air entering the air tower 101 will be released into the fresh food compartment 14 via the secondary exhaust opening 104. Specifically, as shown in FIG. 4B, the secondary exhaust opening 104 is positioned at a top portion of the air tower 101.

Figure 4B:
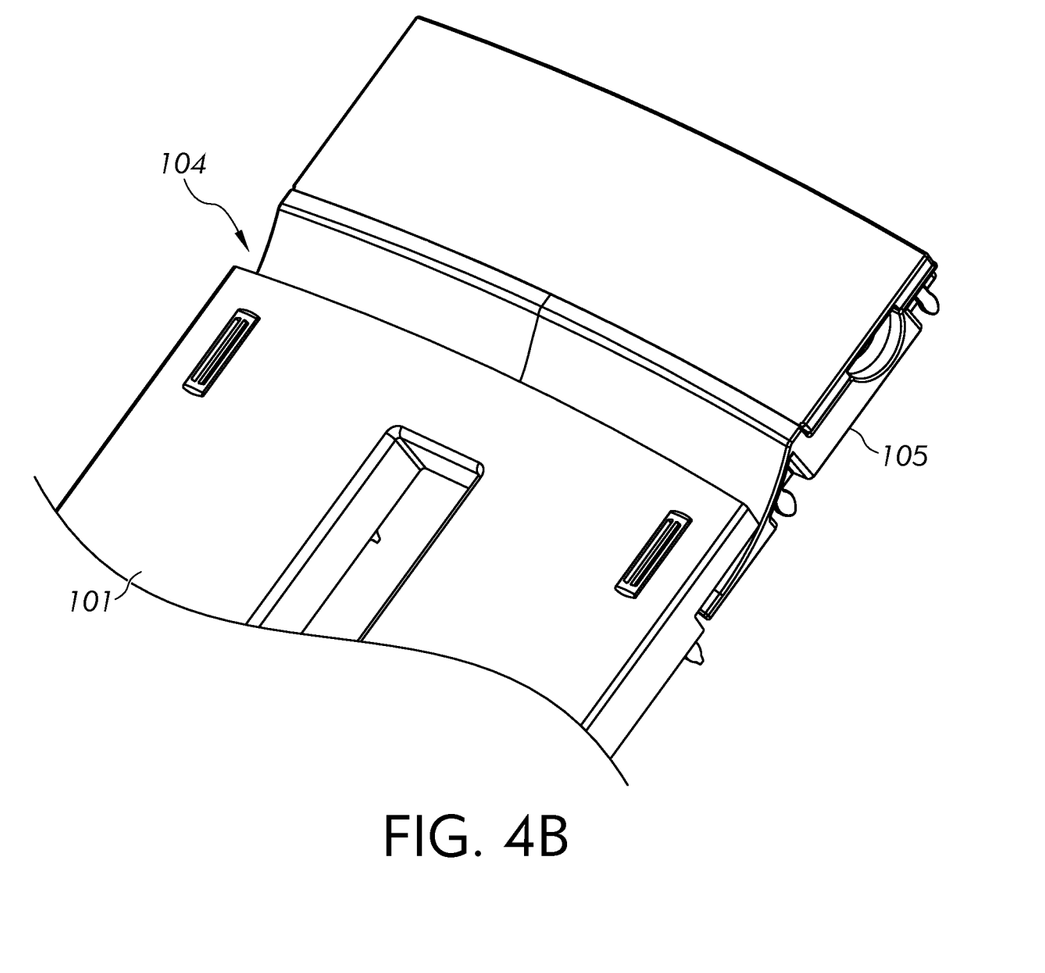
FIG. 4B is an enlarged perspective view of the area encircled in FIG. 4A.
Figure 5A:
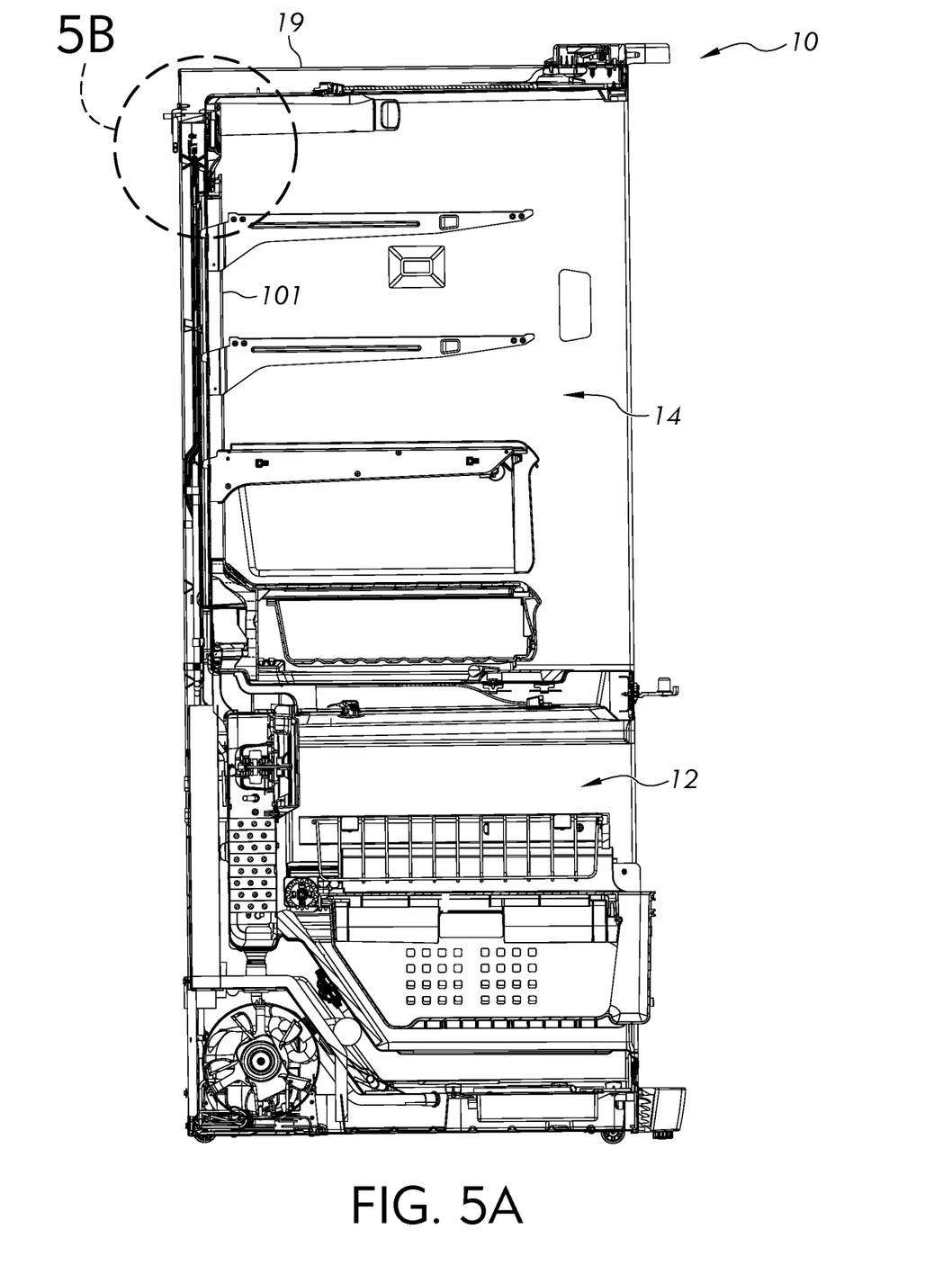
FIG. 5A is a cross-sectional view of the refrigerator of FIG. 3, taken along line 5A-5A.
Figure 5B:
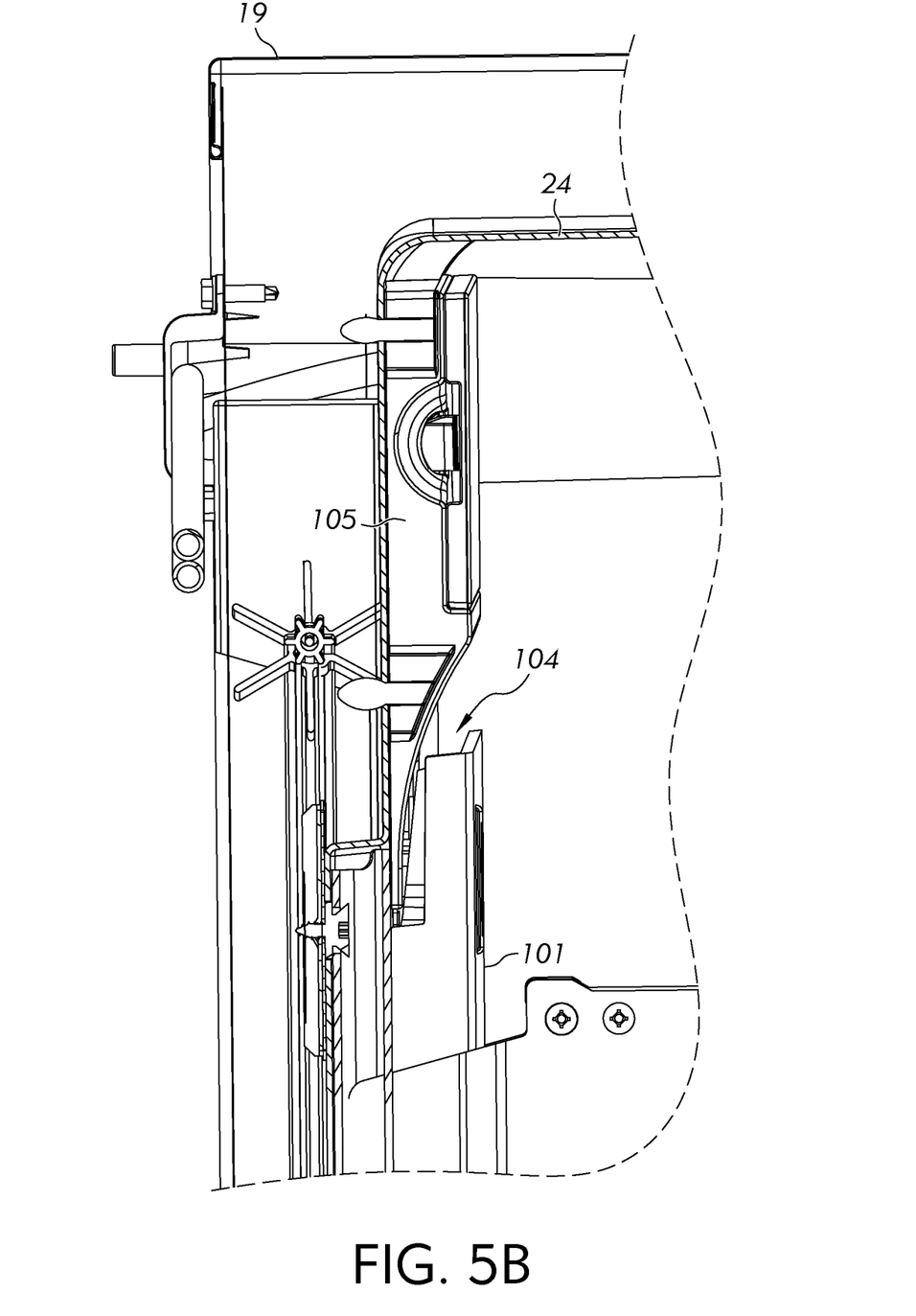
FIG. 5B is an enlarged view of the area encircled in FIG. 5A.

Further, as shown in FIGS. 4A-4B, an air filter bracket 105 is located adjacent the air tower 101 and provided in fluid communication with both the air tower 101 and the fresh food compartment 14. As better detailed in FIGS. 5A-5B, the air filter bracket 105 is separate from the air tower 101 and at least a portion of the air filter bracket 105 is positioned vertically above the air tower 101. In this way, as will be detailed further below, the minor portion of the air exhausted from the air tower 101 will enter the air filter bracket 105 for purifying. Moreover, as shown in FIG. 5B, the secondary exhaust opening 104 is positioned at the top portion of the air tower 101 and is defined by a gap between the air tower 101 and the air filter bracket 105.

Figure 6:
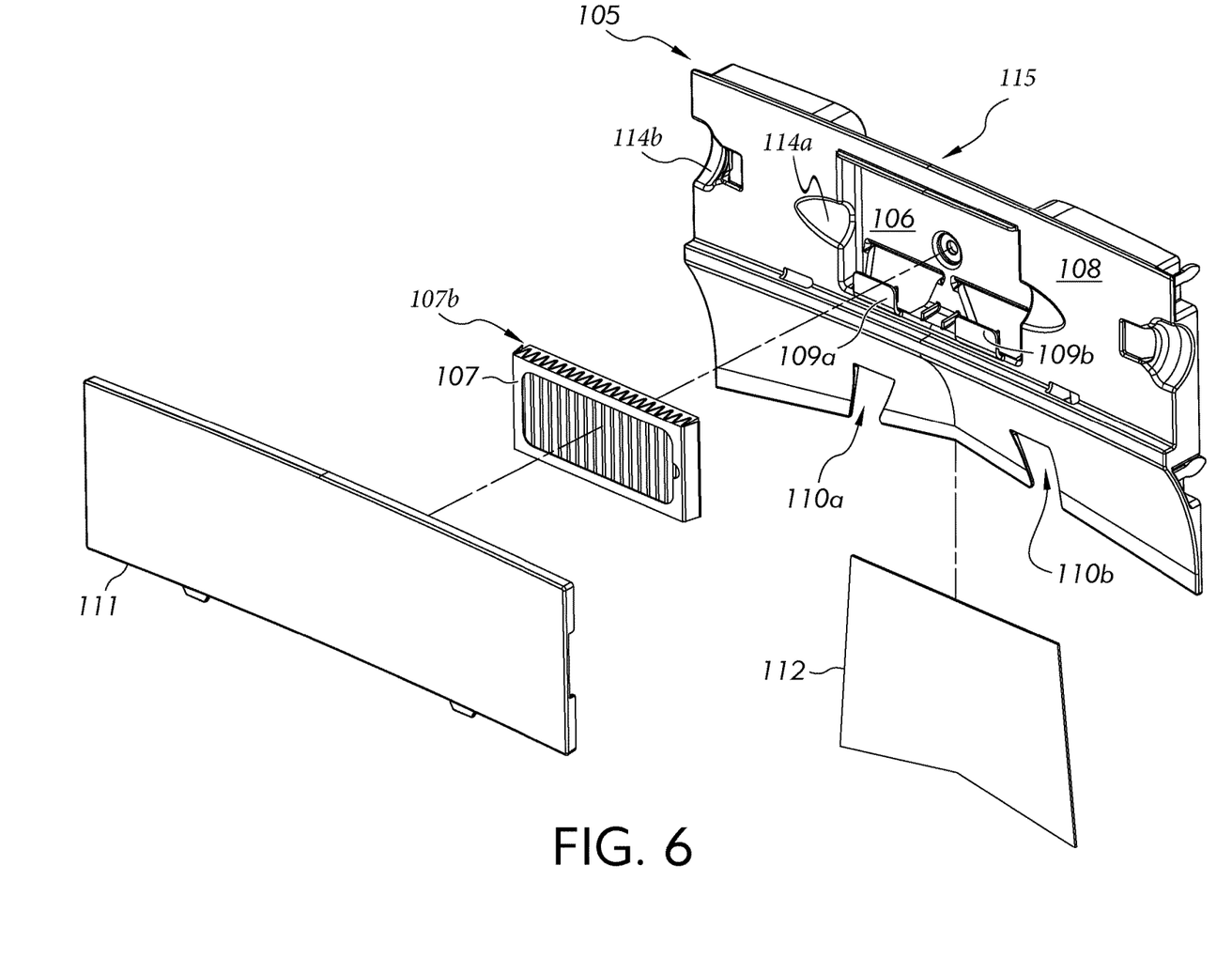
FIG. 6 is an exploded view of the air filter bracket.

Referring now to FIG. 6, the air filter bracket 105 includes a pocket 106 that captures and houses an air filter medium 107 therein. The air filter medium 107 comprises a matrix impregnated with activated carbon wherein the matrix is disposed within an outer structure. Specifically, a cellulose based material (in sheet form) is folded into said matrix and activated carbon is applied to the matrix, which is then placed within the outer structure. As shown, the matrix of the air filter medium 107 preferably has pleats that are arranged vertically with respect to the air filter bracket 105. The outer structure could be, for example, a paperboard, cardboard, or plastic outer container. Additionally, although not shown, the outer structure of the air filter medium 107 may enclose either or both of the top wall 107b and bottom wall. The top wall 107b (and/or bottom wall) may include one or more openings therethrough, such as square, rectangular, or oval-shaped openings, that promote airflow upwards and through the air filter medium 107 to encourage air filtration. Preferably, both of the top wall 107b and bottom wall have openings, such as correspondingly located openings. Such openings through the top wall 107b (and/or bottom wall) can be especially useful where the pleats are arranged vertically with respect to the air filter bracket 105 as shown in FIG. 6. Likewise, such airflow openings can be useful as they allow the intake airflow from the ducts 110 to naturally progress upwards along the blown airflow path and through the air filter medium 107. Alternatively, the pleats may be arranged horizontally with respect to the air filter bracket 105. The air filter medium 107 is not restricted to the aforementioned disclosure. Other air filter mediums known in the art may alternatively be used.

The pocket 106 is recessed with respect to a front face 108 of the air filter bracket 105 and includes a top wall, bottom wall, and opposing side walls. Further, the pocket 106 includes at least one securing member 109 that secures the air filter medium 107 within the pocket 106. Specifically, the pocket includes a first securing member 109a and a second securing member 109b. As shown, the first securing member 109a is spaced a gapped distance apart from the second securing member 109b. Additionally, at least one of the first securing member 109a and the second securing member 109b extends upwards in a vertical direction from the bottom wall of the pocket 106. Further still, at least one of the first securing member 109a and the second securing member 109b may project outwards from the pocket 106 in a perpendicular direction with respect to the front face 108 of the air filter bracket 105 to provide spacing so that the filtered air passing through the air filter medium 107 can outflow from the pocket 106 and be exhausted from the air filter bracket 105. This perpendicular spacing may likewise further cause the cover plate 111 to be spaced a distance from the air filter bracket 105 to thereby provide an air exhaust pathway for the filtered air.

In alternative embodiments, only a single securing member could be used to secure the air filter medium 107 within the pocket 106. Further, the pocket 106 can include no securing members; rather, the air filter medium 107 can be held in place within the pocket 106 by arms or a push member positioned on a back side of a cover plate 111 (further discussed below) when the cover plate 111 is attached to the air filter bracket 105. Further still, the air filter medium 107 may be fixed to the back side of the cover plate 111 and inserted into the pocket 106 when the cover plate 111 is attached to the air filter bracket 105.

The air filter bracket 105 further includes an air duct 110 that directs air into the air filter bracket 105 to pass through the air filter medium 107 therein. Specifically, the duct 110 includes a first inlet 110a that is spaced a gapped distance apart from a second inlet 110b. Further, the duct 110 is positioned vertically below the front face 108 of the air filter bracket 105.

Moreover, a cover plate 111 is removably attached to the front face 108 of the air filter bracket 105. In this way, when the cover plate 111 is in an installed position, the cover plate 111 encloses the pocket 106. The cover plate 111 may include a decorative design in order to make the overall appearance of the air filter bracket 105 more aesthetically pleasing to an end user. Additionally and/or alternatively, the cover plate 111 may be manufactured from plastic or metal, which also provides an aesthetically pleasing appearance.

Figure 7:
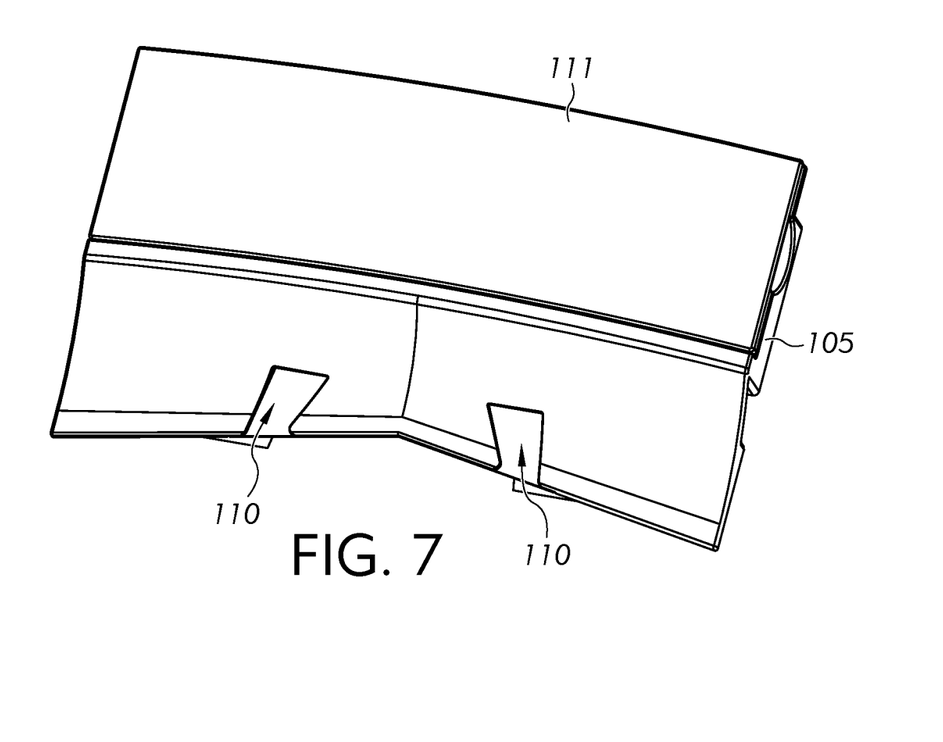
FIG. 7 is a front perspective view of the air filter bracket.
Figure 8:
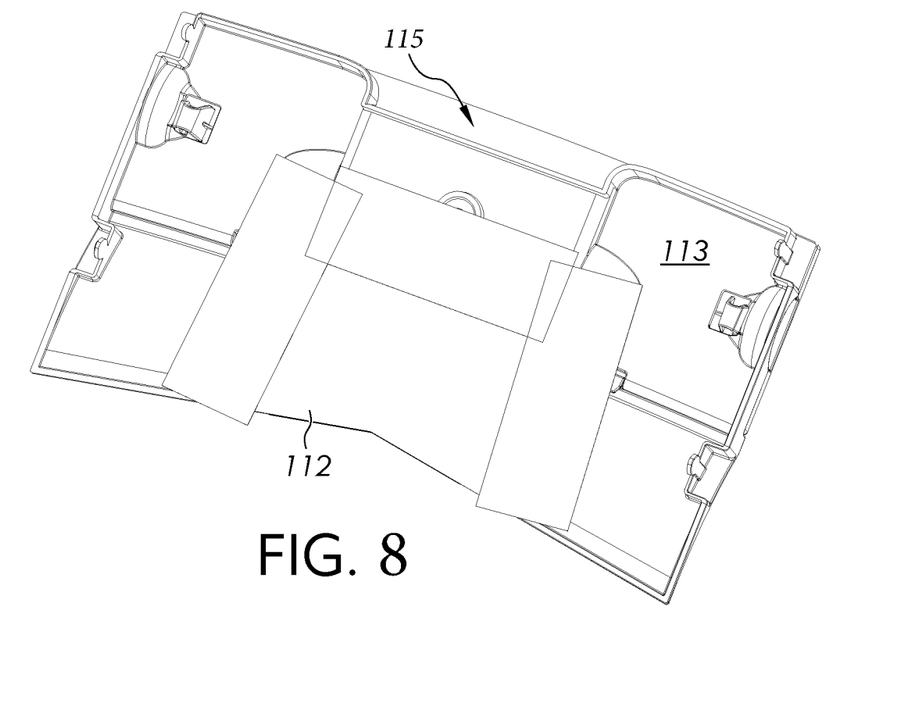
FIG. 8 is a rear view of the air filter bracket.

Further still, a duct cover 112 is attached to a rear side 113 of the air filter bracket (as shown in FIG. 8). The duct cover 112 guides the air entering the duct 110 to the air filter medium 107 (as shown in FIG. 7). As shown in FIG. 6, a first finger access recess 114a is positioned adjacent the pocket 106 and recessed with respect to the front face 108 of the air filter bracket 105. Preferably, at least two such first finger access recesses 114a are used, such as disposed with one each on opposite sides of the pocket 106. These first recesses 114a enable a person to easily insert and/or remove the air filter medium 107 from the pocket 106. Additionally, a second finger access recess 114b is positioned at an edge portion of the air filter bracket 105 and recessed with respect to the front face 108 of the air filter bracket 105. Preferably, at least two such second finger access recesses 114b are used, such as disposed with one each on opposite sides of the air filter bracket 105. These second recesses 114b enable a person to easily attach and/or remove the cover plate 111 onto the air filter bracket 105.

Referring back now to FIG. 5B, the air filter bracket 105 is positioned adjacent the air tower 101 such that the duct 110 is positioned adjacent the flow path of the air tower 101. In this way, the duct 110 of the air filter bracket 105 is in fluid communication with the secondary exhaust opening 104 of the air tower 101. Specifically, the front face 108 of the air filter bracket 105 (with the cover plate 111 installed thereover) is positioned vertically above the air tower 101. Further, when the cover plate 111 is in the installed position, the cover plate 111 lies on a first plane and the front surface 102 of the air tower 101 lies on a second plane. As shown, the first and second planes are substantially parallel. Moreover, the first plane can be the same as the second plane. However, the air filter bracket 105 can be extended or recessed with respect to the air tower 101.

The duct 110 of the air filter bracket 105 is positioned such that the minor portion of the air guided through the air tower 101 is exhausted upwards and out at the top portion of the air tower 101 via the secondary exhaust opening 104 and is directed through the air filter bracket 105 by the duct 110. More specifically, the duct cover 112 guides the minor portion of air entering the duct 110 to flow through the air filter medium 107, be purified, and then exhausted back into the fresh food compartment 14 via exhaust ports. In one example, the air filter bracket 105 may have an exhaust port 115 disposed vertically above the pocket 106 and vertically above the air filter medium 107. In operation, after the minor portion of air has been purified by traversing upwards through the air filter medium 107, the air will exit the pocket 106 via the exhaust port 115 and travel upwards into the refrigerator compartment, for example, be exhausted into the fresh food compartment 14. Placement of the exhaust port 115 above the air filter medium 107 can be especially useful where the filter media pleats are arranged vertically with respect to the air filter bracket 105 as shown in FIG. 6 to thereby increase airflow efficiency through the filter media. Although only a single exhaust port 115 is shown, it is contemplated that multiple exhaust ports could be utilized. For example, the air filter bracket 105 may have additional and/or alternative ports for exhausting the air to the fresh food compartment 14.

An amount of the minor portion of air exhausted out of the air tower 101 via the secondary exhaust opening 104 is within a range of 1%-49% of an amount of air being directed into the air tower 101 via the fan. Preferably the minor portion of air is within a range of 1%-25%, and more preferably within a range of 1%-10% of the amount of air being directed into the air tower 101.

Thus, as can be seen by the foregoing description, the flow path of the air tower 101 is configured to guide air vertically upwards wherein a major portion of said air is released into the fresh food compartment 14 via the plurality of primary exhaust openings 103 and a minor portion of said air exits the secondary exhaust opening 104 and enters the air filter bracket 105 through the duct 110 and is directed to the air filter medium 107 by the duct cover 112.

In this manner, the refrigerator appliance architecture, manufacturing, and service are all simplified in that an air filter bracket is separate from and positioned vertically above an air tower such that said air tower does not need to be redesigned. Instead, only an air filter bracket needs to be installed to provide an active air filter design. Additionally, the overall configuration of the air filter bracket, cover plate, and duct cover sustains a pleasurable aesthetic within the fresh food compartment while promoting superior air purification.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. A refrigerator comprising:
   a cabinet;
   a liner defining a compartment within the cabinet;
   a fan disposed outside the compartment;
   an air tower positioned adjacent the liner and provided in fluid communication with the compartment via a plurality of primary exhaust openings, the air tower defining a flow path between the fan and the compartment such that the fan directs air into the air tower and the flow path of the air tower guides a major portion of the air into the compartment via at least one of the primary exhaust openings; and
   an air filter bracket separate from and located adjacent to the air tower and provided in fluid communication with both the air tower and the compartment, the air filter bracket comprising:
      a pocket that captures an air filter medium therein, the pocket including at least one securing member that secures the air filter medium within the pocket; and
      a duct positioned adjacent the flow path of the air tower to be in fluid communication with a secondary exhaust opening of the air tower,
      wherein the duct directs air into the air filter bracket to pass through the air filter medium therein and is positioned such that a minor portion of the air guided through the air tower is directed through the air filter bracket by the duct wherein the compartment comprises a fresh food compartment and the fan is disposed outside of the fresh food compartment and within a freezer compartment.

2. The refrigerator of claim 1, further comprising a cover plate removably attached to a front face of the air filter bracket such that, when the cover plate is in an installed position, the cover plate encloses the pocket.

3. The refrigerator of claim 2, wherein the duct is positioned vertically below the front face of the air filter bracket.

4. The refrigerator of claim 1, wherein the plurality of primary exhaust openings are positioned on a front surface of the air tower and disposed in a vertical orientation such that the major portion of the air guided by the flow path of the air tower is released into the compartment via the plurality of primary exhaust openings.

5. The refrigerator of claim 1, further comprising a duct cover attached to a rear side of the air filter bracket, the duct cover guides the minor portion of air entering the duct to the air filter medium.

6. The refrigerator of claim 1, wherein the pocket includes a first securing member and a second securing member and wherein the first securing member is spaced a gapped distance apart from the second securing member.

7. The refrigerator of claim 6, wherein at least one of the first securing member and the second securing member extends upwards in a vertical direction from a bottom wall of the pocket.

8. The refrigerator of claim 1, wherein at least a portion of the air filter bracket is positioned vertically above the air tower.

9. The refrigerator of claim 8, further comprising a cover plate removably attached to a front face of the air filter bracket such that, when the cover plate is in an installed position, the cover plate encloses the pocket.

10. The refrigerator of claim 9, wherein the front face of the air filter bracket is positioned vertically above the air tower.

11. The refrigerator of claim 9, wherein when the cover plate is in an installed position, the cover plate lies on a first plane and a front surface of the air tower lies on a second plane, and wherein the first plane and the second plane are substantially parallel.

12. The refrigerator of claim 1, wherein the secondary exhaust opening is positioned at a top portion of the air tower and is defined by a gap between the air tower and the air filter bracket.

13. The refrigerator of claim 1, wherein an amount of the major portion of air released into the compartment via the plurality of primary exhaust openings is within a range of 51%-90% of an amount of air being directed into the air tower via the fan.

14. A refrigerator comprising:
   a cabinet;
   a liner defining a compartment within the cabinet;
   a fan disposed outside the compartment;
   an air tower positioned adjacent the liner and provided in fluid communication with the compartment via a plurality of primary exhaust openings positioned on a front surface of the air tower, the air tower defining a flow path between the fan and the compartment such that the fan directs air into the air tower and the flow path of the air tower guides a major portion of the air into the compartment via the primary exhaust openings;
   an air filter bracket separate from and having a portion located vertically above the air tower and provided in fluid communication with both the air tower and the compartment, the air filter bracket comprising:
      a pocket that captures an air filter medium therein, the pocket including at least one securing member that secures the air filter medium within the pocket; and
      a duct positioned adjacent the flow path of the air tower to be in fluid communication with a secondary exhaust opening of the air tower positioned at a top portion of the air tower and defined by a gap between the air tower and the air filter bracket,
      wherein the duct directs air into the air filter bracket to pass through the air filter medium therein and is positioned such that a minor portion of the air guided through the air tower is directed through the air filter bracket by the duct; and a duct cover attached to a rear side of the air filter bracket, the duct cover guides the minor portion of air entering the duct to the air filter medium wherein the compartment comprises a fresh food compartment and the fan is disposed outside of the fresh food compartment and within a freezer compartment.

15. The refrigerator of claim 14, further comprising a cover plate removably attached to a front face of the air filter bracket such that, when the cover plate is in an installed position, the cover plate encloses the pocket.

16. The refrigerator of claim 15, wherein the front face of the air filter bracket is positioned vertically above the air tower.

17. The refrigerator of claim 15, wherein when the cover plate is in an installed position, the cover plate lies on a first plane and a front surface of the air tower lies on a second plane, and wherein the first plane and the second plane are substantially parallel.

18. The refrigerator of claim 14, wherein an amount of the major portion of air released into the compartment via the plurality of primary exhaust openings is within a range of 51%-90% of an amount of air being directed into the air tower via the fan.

\* \* \* \* \*